April 25, 1944.  W. J. HUMPHREY  2,347,349
MASTER CYLINDER
Filed Feb. 2, 1942  2 Sheets-Sheet 1

INVENTOR
WILLIAM J. HUMPHREY
BY
*m. W. McConkey*
ATTORNEY

April 25, 1944.  W. J. HUMPHREY  2,347,349
MASTER CYLINDER
Filed Feb. 2, 1942  2 Sheets-Sheet 2

INVENTOR
WILLIAM J. HUMPHREY
BY
M. W. McConkey
ATTORNEY

Patented Apr. 25, 1944

2,347,349

UNITED STATES PATENT OFFICE 2,347,349

MASTER CYLINDER

William J. Humphrey, South Bend, Ind., assignor to Bendix Aviation Corporation, South Bend, Ind., a corporation of Delaware Application February 2, 1942, Serial No. 429,153

4 Claims. (Cl. 60—54.6)

This invention relates to fluid pressure producing and controlling devices, and is illustrated as embodied in a two-stage master cylinder for actuating hydraulic brakes or the like.

The object of this invention is to provide an improved two-stage fluid pressure device, i. e., a device which causes an initial high volume low pressure fluid movement to be automatically succeeded by a low volume high pressure fluid movement when a predetermined condition has been attained. My two-stage device is an improvement over similar devices previously developed in several respects including the following: (a) the structure of the device is simple and uncomplicated but does not thereby sacrifice efficiency (b) the device does not create the objectionable "two-stage feel" which occurs in many two-stage devices at the time of change-over from the first to the second stage and (c) means are provided for eliminating any danger of loss of liquid from the pressure cylinders owing to a rapid brake application.

As is well known in the art, the object of two-stage pressure producing or controlling devices is primarily to conserve pedal travel or travel of whatever manual means may be used to operate the pressure producing device. In applying brakes or other friction devices there are two important stages: In the first stage the shoes or friction elements must be moved against the drum or cooperating friction element before the desired friction can be created; in the second stage high pressure must be applied to the friction elements in order to build the friction up to a point high enough to accomplish the desired result. In the first stage the amount of pressure is relatively unimportant but the amount of movement is important. In the second stage the situation is reversed, movement of the parts becoming less important but high pressure being necessary. Utilization of a two-stage device allows the first part of the pedal or manual lever movement in a fluid pressure system to displace large amounts of fluid and thereby bring the friction elements into the proper position for creating friction and causes subsequent pedal or lever movement to operate at a relatively high leverage ratio so that a given force exerted on the pedal or lever will create a greater unit pressure tending to build up friction than would be the case if the high displacement of fluid continued through the whole pedal movement. It has been customary to utilize a large diameter piston for the first stage and a small diameter piston for the second stage, providing means for automatically shifting the manually applied pressure from one piston to the other whenever a given pressure has been reached in the system. The means used for controlling the change-over is of paramount importance because it determines the effectiveness of the system and determines whether or not an erratic or "two-stage feel" will be present. The "two-stage feel" referred to occurs as follows. When the change-over from the first stage to the second stage is accomplished the leverage ratio is changed and, if the change-over is not accomplished gradually, the operator, when the second stage is reached, will feel a sudden falling off in the resistance of the fluid to his manual effort. By utilizing a spring loaded outlet valve for discharging the large diameter chamber after a certain predetermined pressure has been built up by the large diameter piston, I prevent the reaction pressure of fluid in the large diameter chamber from being subtracted from the total reaction against the pedal and thus I cause the change-over from one stage to the other to be gradual and without "two-stage feel."

Other objects and features of my invention, as well as the relationship of my invention to the matters discussed above, will become apparent during the following description of an illustrative embodiment of my device, reference being had during the description to the accompanying drawings, in which.

Figure 1:
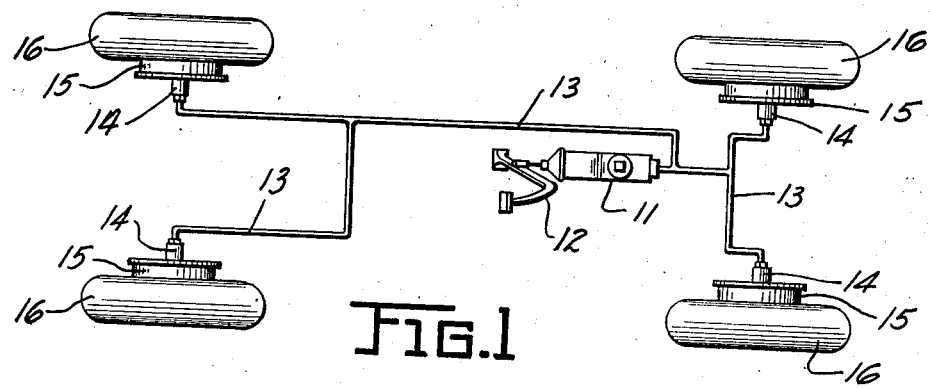
Fig. 1 is a diagrammatic showing of a hydraulic brake system utilizing my invention.

Referring to the drawings for an illustration showing one manner in which my invention may be utilized, we find in Fig. 1 a hydraulic brake system comprising essentially a pressure producing or controlling device or master cylinder unit 11, a manually operable pedal or lever 12 for operating the device 11, a plurality of conduits 13 leading from the master cylinder 11, a plurality of fluid pressure operated motors 14 connected to the conduits 13, a plurality of friction brakes indicated generally at 15 arranged to be operated by the motors 14, and a plurality of wheels 16 adapted to be braked by brakes 15.

Figure 2:
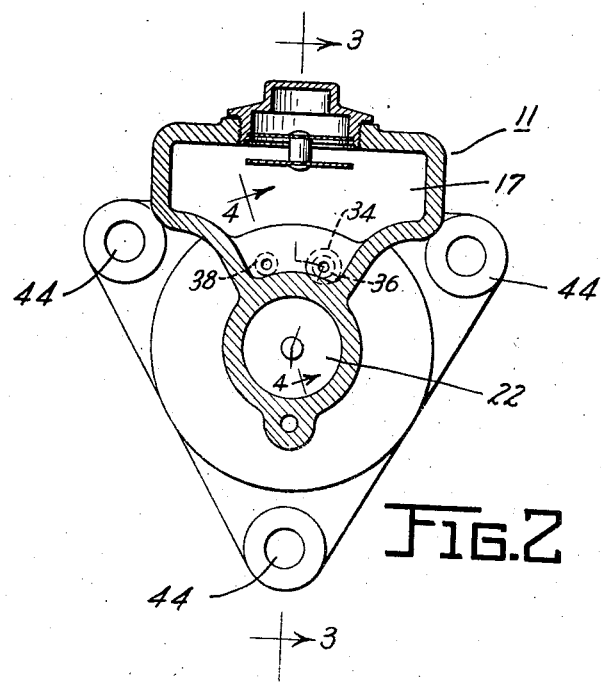
Fig. 2 is a vertical section taken through the pressure producing device or master cylinder of Fig. 1 and taken on the line 2—2 of Fig. 3.
Figure 3:
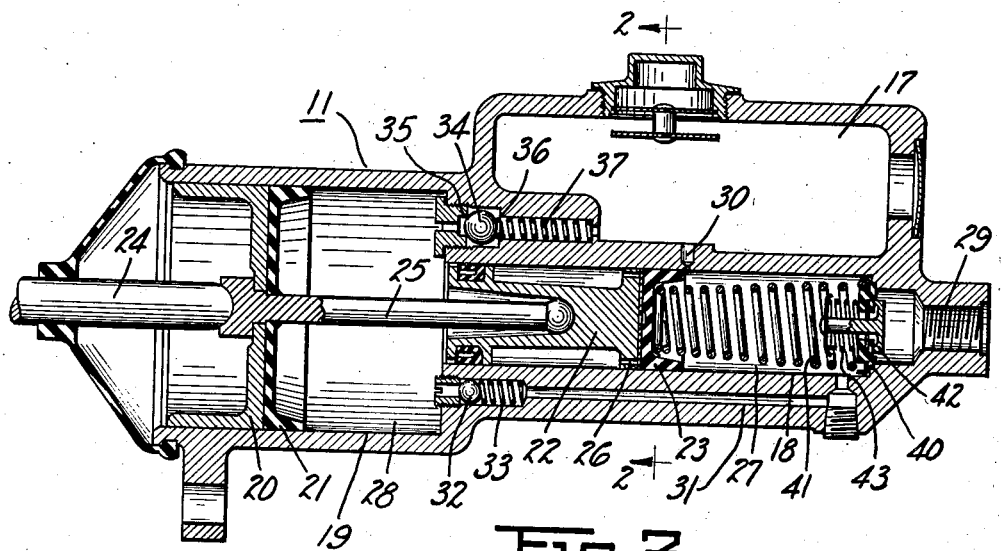
Fig. 3 is a section taken on the line 3—3 of Fig. 2.
Figure 4:
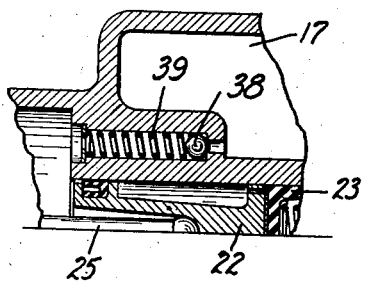
Fig. 4 is a section taken on the line 4—4 of Fig. 2.

In Figures 2, 3, and 4 are shown close-ups of the master cylinder unit 11. The master cylinder unit may comprise as shown a single integrated body having a reservoir portion 17, a relatively small cylinder bore 18 and a relatively large cylinder bore 19. A large diameter piston 20 provided with a sealing cup 21 is reciprocable in the large cylinder bore 19, while a small diameter piston 22 provided with a flexible sealing cup 23 is reciprocable in the small cylinder bore 18. A push rod 24 connects the lever 12 to the large piston 20 and a push rod 25 connects the large piston 20 to the small piston 22, the arrangement being such that movement of the lever 12 may exert force through rods 24 and 25 to move both pistons 20 and 22 toward the right as seen in Fig. 3. Piston 22 has a plurality of passages 26 through the head thereof to allow under certain circumstances communication of a small diameter pressure chamber 27 formed ahead of piston 22 with a large diameter pressure chamber 28 formed ahead of piston 20.

Connections between the pressure chambers, the reservoir and the brake applying motors are as follows. A port 29 in the body of the master cylinder unit connects the small diameter high pressure chamber 27 to the conduits 13 which lead to the hydraulic motors 14. A compensating port 30 maintains fluid communication between the reservoir 17 and the high pressure chamber 27 so long as the piston 22 is in retracted position. A passage 31 formed in the body of the master cylinder unit connects the large diameter low pressure chamber 28 to the high pressure chamber 27. This passage is controlled by a one-way valve which allows fluid to flow from the low pressure chamber 28 to the high pressure chamber 27 but not from the high pressure chamber to the low pressure chamber, said valve comprising a valve element 32 urged to seat by a spring 33. Communication between the reservoir 17 and low pressure chamber 28 is controlled by two valves, one an outlet valve which controls change-over from the first to the second stage of the brake application and the other a simple one-way compensating valve. The outlet or control valve comprises a valve element 34, a valve seat 35 at one side of the valve element 34, a valve seat 36 at the other side of the valve element 34, and a spring 37 urging the valve element to seat at 35. The one-way compensating valve between the reservoir and the low pressure chamber (see Fig. 4) comprises a valve element 38 and a spring 39 urging the valve element to seat. This valve allows passage of fluid from the reservoir to the low pressure chamber but not from the low pressure chamber to reservoir. Referring again to the first mentioned or outlet valve, it will be noted that movement of valve element 34 between the valve seats 35 and 36 is slight so that sudden movement of valve element 34 from valve seat 35 will cause the valve element to seat at 36 again cutting off communication between the low pressure chamber and reservoir. Communication between high pressure chamber 27 and the hydraulic motors 14 through port 29 is controlled by a two-way check valve adjacent the port. This check valve comprises a resilient washer 40 which is adapted to seat against the cylinder wall at the end of chamber 27, a spring 41 urging the washer 40 to seat, a poppet valve element 42 having a head adapted to seat against the washer 40 and a stem extending through the washer, and a spring 43 urging the head of the poppet valve element 42 to seat.

Operation of my two-stage fluid pressure device will now be described. Rod 24 is actuated by lever 12 and pushes pistons 20 and 22 into the chambers 28 and 27 respectively forcing liquid to brake actuating motors 14 by forcing it past valves 32 and 42, springs 33 and 43 being light enough so that very little pressure will be required to overcome them and allow the passage of liquid. Since both the large piston 20 and the small piston 22 are displacing liquid to the hydraulic motors, a large volume of liquid under a relatively low pressure will serve to move the brake shoes against the brake drum. As the shoes reach the drum, resistance to their further movement increases. Force exerted on lever 12 to overcome this increased resistance will increase the fluid pressure in chambers 27 and 28 until the pressure of the fluid in chamber 28 forces valve 34 from its seat at 35. As long as valve 34 remains unseated it allows the escape of fluid from the low pressure chamber 28 to the reservoir. Escape of fluid from low pressure chamber 28 at a given pressure holds the resistance of such fluid to movement of the large piston 20 at a constant amount and allows the added force exerted by the operator on lever 12 to be applied directly through rods 24 and 25 to small diameter piston 22. Owing to the fact that the increased effort of the operator is now being exerted only against the small diameter piston, a given increment of operator effort will produce a much higher unit pressure in the brake lines than heretofore.

The constant pressure of spring 37 tending to seat valve 34 prevents the resistance of fluid in low pressure chamber 28 to movement of piston 20 from suddenly disappearing, and by thus preventing a sudden change-over from the high displacement stage to the low displacement stage, prevents the phenomenon which has been referred to above as "two-stage feel." After the change-over from one-stage to the other has been accomplished additional pressure on rods 24 and 25 causes high pressure piston 22 to directly and individually apply the brakes. When pressure on lever 12 is released liquid from the motor cylinders returns to chamber 27 by forcing valve 40 from its seat and thence returns directly through compensating port 30 to the reservoir, said compensating port 30 being uncovered when piston 22 is in its retracted position though the said port is normally covered by sealing cup 23 during brake applying movement of the piston 22. Chamber 28 is filled with liquid from reservoir 17 moving past valve 38 which is very lightly spring loaded.

In the event of a sudden or very rapid brake application piston 20 would cause liquid in chamber 28 to open valves 32 and 34 almost simultaneously. Valve 34 would move to seat at 36 to close communication between chamber 28 and the reservoir and thereby prevent any loss of liquid to the reservoir. Thus it is impossible for a sudden brake application to cause an immediate build-up in line resistance and in the low pressure chamber such as to hold open the valve 34 through the whole brake application and eliminate the low pressure stage. Elimination of the low pressure stage is to be avoided because pedal travel must be sufficient to cause a full application of the brakes. Under slow or normal brake application valve 34 will remain seated at 35 until a predetermined pressure sufficient to overcome spring 37 has been reached, spring 37 being somewhat heavier and harder to compress than either spring 33 or 43. Valve 40 serves to retain a certain pressure in the brake lines and in the brake actuating motors at all times, the amount of pressure retained depending upon the strength of spring 41. In the event of vacuum in chamber 27 during the return stroke of piston 22, liquid will pass from chamber 28 through passages 26 and around sealing cup 23 into chamber 27.

Since the specific embodiment of my invention described herein is intended to be illustrative merely it is not my intention to limit the scope of my invention otherwise than by the terms of the appended claims.

What is claimed is:

1. For use in a fluid pressure system having a fluid pressure operable motor, a two-stage fluid pressure controlling device comprising a fluid reservoir, a small diameter fluid containing chamber, a large diameter fluid containing chamber, a small diameter piston reciprocable in the small diameter chamber, a large diameter piston reciprocable in the large diameter chamber, a fluid connection between the small diameter chamber and the fluid operable motor, a one-way fluid connection between the large diameter chamber and the fluid operable motor which permits flow of fluid from the chamber to the motor but not from the motor to the chamber, a fluid connection between the large diameter chamber and the reservoir, a valve controlling said last named fluid connection, a valve seat for said last named valve when it is in one position, a second valve seat for said last named valve when it is in another position, the movement of the valve from one seat to the other being relatively slight, and resilient means urging the valve to the first seat, the pressure of fluid in the large diameter chamber tending to move the valve from the first seat toward the second seat.

2. For use in a fluid pressure system having a fluid pressure operable motor, a two-stage fluid pressure controlling device comprising a fluid reservoir, a small diameter fluid containing chamber, a large diameter fluid containing chamber, a small diameter piston reciprocable in the small diameter chamber, a large diameter piston reciprocable in the large diameter chamber, operator operated means for simultaneously applying force to both pistons to move them in a pressure creating direction, a fluid connection between the small diameter chamber and the fluid operable motor, a one-way fluid connection between the large diameter chamber and the fluid operable motor which permits flow of fluid from the chamber to the motor but not from the motor to the chamber, a fluid connection between the large diameter chamber and the reservoir, a valve controlling said last named fluid connection, a valve seat for said last named valve when it is in one position, a second valve seat for said last named valve when it is in another position, the movement of the valve from one seat to the other being relatively slight, and resilient means urging the valve to the first seat, the pressure of fluid in the large diameter chamber tending to move the valve from the first seat toward the second seat.

3. For use in a fluid pressure system having a fluid pressure operable motor, a two-stage fluid pressure controlling device comprising a fluid reservoir, a small diameter fluid containing chamber, a large diameter fluid containing chamber, a small diameter piston reciprocable in the small diameter chamber, a large diameter piston reciprocable in the large diameter chamber, a fluid connection between the both chambers and the fluid operable motor, a fluid connection between the large diameter chamber and the reservoir, a valve controlling said last named fluid connection, a valve seat for said last named valve when it is in one position, a second valve seat for said last named valve when it is in another position, the movement of the valve from one seat to the other being relatively slight, and resilient means urging the valve to the first seat, the pressure of fluid in the large diameter chamber tending to move the valve from the first seat toward the second seat.

4. For use in a fluid pressure system having a fluid pressure operable motor, a two-stage fluid pressure controlling device comprising a fluid reservoir, a small diameter fluid containing chamber, a large diameter fluid containing chamber, a small diameter piston reciprocable in the small diameter chamber, a large diameter piston reciprocable in the large diameter chamber, operator operated means for simultaneously applying force to both pistons to move them in a pressure creating direction, a fluid connection between both of the chambers and the fluid operable motor, a fluid connection between the large diameter chamber and the reservoir, a valve controlling said last named fluid connection, a valve seat for said last named valve when it is in one position, a second valve seat for said last named valve when it is in another position, the movement of the valve from one seat to the other being relatively slight, and resilient means urging the valve to the first seat, the pressure of fluid in the large diameter chamber tending to move the valve from the first seat toward the second seat.

WILLIAM J. HUMPHREY